Jan. 29, 1924.
P. E. KLOPSTEG ET AL
1,481,869
ELECTRIC HEATER
Filed Nov. 19, 1921
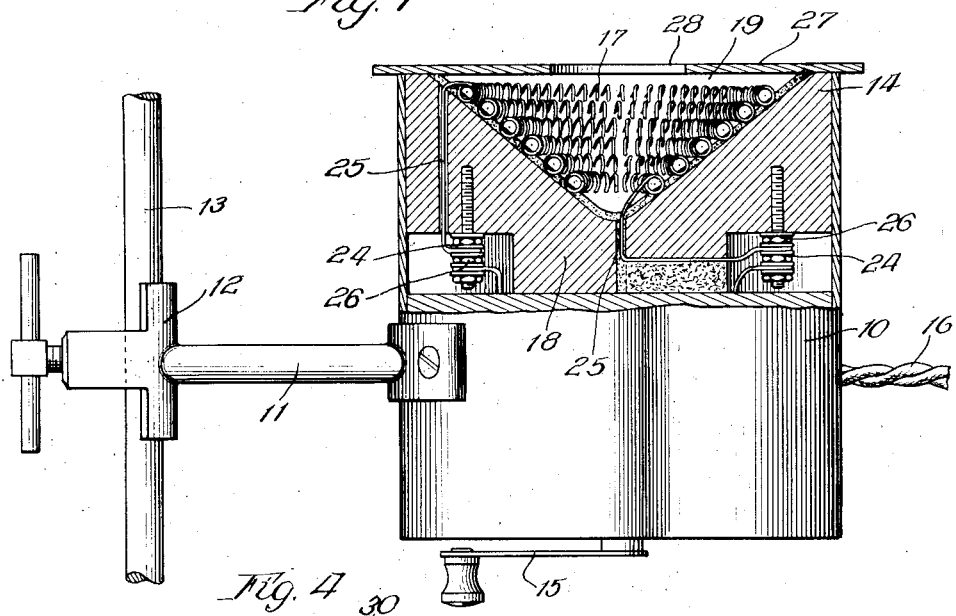
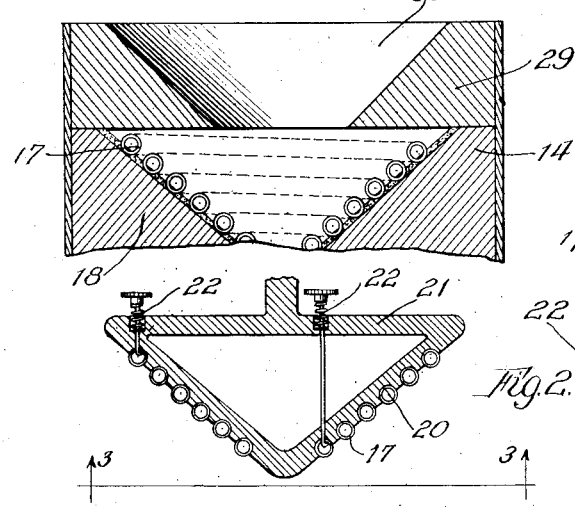
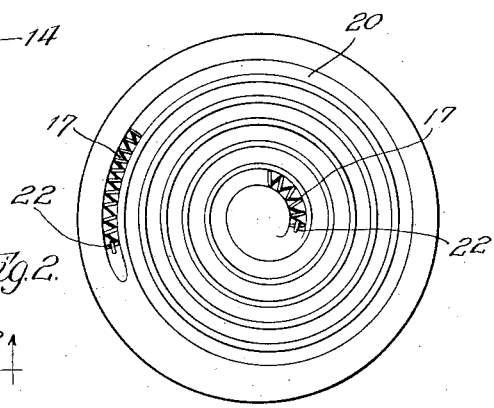
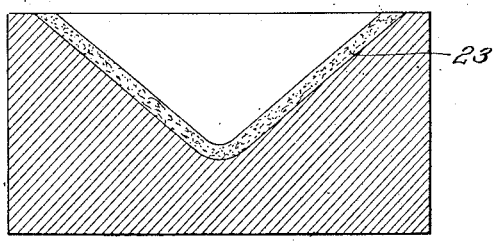
Inventor:
Paul E. Klopsteg
Carl S. Hornberger &
Willard H. Fars
By: Wm O. Belt Atty.

Patented Jan. 29, 1924.

1,481,869

UNITED STATES PATENT OFFICE.

PAUL E. KLOPSTEG, OF HOMEWOOD, AND CARL S. HORNBERGER AND WILLARD H. FARR, OF CHICAGO, ILLINOIS, ASSIGNORS TO CENTRAL SCIENTIFIC COMPANY, OF CHICAGO, ILLINOIS, A CORPORATION OF ILLINOIS.

ELECTRIC HEATER.

Application filed November 19, 1921. Serial No. 516,300.

*To all whom it may concern:*

Be it known that we, PAUL E. KLOPSTEG, Homewood, CARL S. HORNBERGER, Chicago, and WILLARD H. FARR, Chicago, in the county of Cook and State of Illinois, have invented certain new and useful Improvements in Electric Heaters, of which the following is a specification.

This invention relates to electric heaters and has for its principal object to obtain a rapid and efficient source of concentrated heat.

Other objects contributing to the attainment of the principal object, are to avoid loss of heat due to absorption, to obtain a compact heating element presenting great radiating surface, to provide a non-conducting container for the heating element that will concentrate the heat developed and deliver it at a desired point or area of application, and to provide a novel process of manufacture whereby the heating element may be secured solidly in place with small loss of heating surface.

Other objects will become apparent as the description is read in connection with the accompanying drawing illustrating a selected embodiment of the invention, and in which—

Fig. 1 is a side elevation partly in section, illustrating one form of heater suitable for laboratory uses;

Fig. 2 is a transverse sectional view of the insulating container and the tool with which the heating coil is placed in the container;

Fig. 3 is an inverted plan view of the tool illustrated in Fig. 2; and

Fig. 4 is a vertical sectional view illustrating a modified construction.

In Fig. 1, 10 indicates a casing for the heater which may be made of any suitable material and equipped with any desired supporting means. As illustrated, it is secured to an arm 11 of a clamp 12 adapted to be adjustably secured to an upright 13 to support the heater in the desired position. The upper part of the casing is occupied by a heating unit generally indicated by 14 while the lower part is equipped with a rheostat, and other suitable appurtenances, of which we have considered it sufficient to illustrate a rheostat handle 15 and a power cable 16.

The heating unit is composed of a coil 17 and a base 18 made of insulating material, and having an upwardly diverging chamber 19 in which the coil is mounted. We have found that substances known to the trade as sil-o-cell and kieselguhr have the desired insulating properties, but we do not wish to be limited in this or any other respect as far as material is concerned, for we consider our invention to be of sufficient scope to include known equivalents of the various materials used in construction. Both sil-o-cell and kieselguhr are very fragile and on that account it is somewhat difficult to suitably secure the coil 17 in the chamber 19. By preference, this chamber 19 is generally conical in shape, enlarging towards the upper side, and the coil 17 in the form of a helix, is wound spirally about the inclined walls of the chamber 19. In order to obtain the maximum heating surface, it is necessary to have as many turns of the spiral as the diameter of the helix and the height of the cone will permit, and it becomes very important that the coil be secured in place at so many points that it is impossible for the adjacent turns of the spiral to come in contact.

The process which we have found most suitable in securing the coil in the chamber 19 is as follows:—

(1) The chamber is filled completely with alundum cement mixed to about the consistency of commercial cream. In a very short time the highly porous sil-o-cell or kieselguhr will extract sufficient water from the cement to cause a layer adjacent to the walls of the chamber 19 to become relatively stiff or slightly set and the excess cement is then poured out. By this means the entire inner surface of the chamber 19 is lined with a layer of cement of suitable thickness.

(2) A helix, preferably of nichrome wire of the desired gauge and diameter of helix, is laid into a spiral groove 20 on the face of the conical tool 21 and its opposite ends are secured by spring pressed hooks 22. The coil is preferably annealed while in position on this tool, whereby all tendency of the coil to straighten out or change from the spiral conformation is eliminated.

(3) A little water is sprayed or otherwise uniformly distributed over the surface of the layer of cement 23 in order to soften its surface, and the tool 21 with the coil 17 thereon is inserted in the conical chamber 19 and sufficient pressure applied to lightly imbed the lower portions of each convolution of the helix in the surface of the layer 23 of cement. By carefully adding sufficient water uniformly distributed over the surface of the cement, it can be made sufficiently fluid to permit the convolutions of the wire to be imbedded in the surface of the cement and entirely surrounded by the cement flowing together over each convolution. It is very important that no greater portion of the wire be covered by the cement than is necessary to properly secure the coil in place. The ends of the coil may be equipped with suitable lengths of wire which are passed through openings 25 provided in the base 18, and are later secured to the binding posts 26, or made fast in any other suitable manner.

(4) The spring hooks 22 are disengaged from the ends of the coil and by an unscrewing movement, the tool 21 is carefully removed, leaving the coil with its nether portions imbedded in the plastic cement. The highly porous block 18 will again rapidly extract the water from the cement, and in short time the layer 23 will be sufficiently stiff to permit the assembly to be handled without danger. The block 18 with the cement layer 23 and the coil 17 in place therein, is transferred to a suitable oven and baked at a temperature of approximately 1400° F. or if desired, the coil may be connected with a suitable source of electric current, and the baking can be accomplished through the heat developed by the unit itself.

The layer 23 of cement becomes very hard and tough when baked and forms a strong support and fastening for the coil 17. In addition, the baked cement becomes highly refractory. In some cases we have found it expedient to follow this process with a plaster block 18 substituted for the sil-o-cell or kieselguhr and after the baking operation remove the plaster and mount the conical cup of cement 23 with the coil attached in a suitably prepared base of insulating material. However, we prefer to conduct the process with the block 18 of insulating material to be used in service, and thus form, a heating unit that can be readily removed from the casing 10 and replaced by the new or more desirable unit with very little difficulty.

This conical heating chamber with the helical coil wound in spiral turns along the wall of the chamber results in a very compact and efficient heating unit, and by being carful to imbed the wire no deeper in the cement than is necessary to permit the extreme nether portions of the convolutions to be covered, very little heating surface of the coil is lost.

For certain laboratory purposes, it is very desirable to concentrate heat on a comparatively small area of application. The heating unit here disclosed will accomplish that result very satisfactorily. However, by placing a cap 27, in the form of a disc of transite or similar material, on top of the unit and providing it with a suitable opening 28, the results are much improved.

We have also obtained very satisfactory results by replacing the transite strip 27 with a relatively thick cap 29 of sil-o-cell or kieselguhr and forming therein a conical passage 30 suited to the particular use. This cap 29 materially increases the efficiency of the heater by concentrating the heat developed on the area determined by the size and shape of the passage 30.

We are aware that changes may be made in the form, construction and arrangement of the invention, as set forth in the selected embodiment herein, without departing from the scope or sacrificing any of its material advantages, and we therefore reserve the right to make all such changes as fairly fall within the scope of the following claims.

We claim:

1. In an electric heater, a heating unit comprising a base of insulating material having an upwardly diverging chamber therein, a heating coil in said chamber, and cement securing the coil to the wall of said chamber and covering a small portion only of the coil.

2. In an electric heater, a heating element comprising a base of sil-o-cell having an upwardly diverging chamber therein, a helical coil wound in spiral conformation in said chamber, and cement securing the nether portions of the convolutions of the coil to the walls of the chamber.

3. In an electric heater, a casing, a heating element supported therein comprising a base of sil-o-cell having a conical chamber therein diverging upwardly, a heating coil of spiral conformation seated in said chamber and secured to the walls of said chamber by baked alundum cement.

4. In an electric heater, a casing, a heating unit therein comprising a base of insulating material having a conical chamber in its upper portion, a coil spirally wound about the surface of said chamber, and a cap of insulating material above said heating unit and having a passage therein for heat.

5. In an electric heater, a casing, means for supporting said casing, a heating unit in the casing comprising a base of insulating material having a conical chamber in its upper side, a helical coil spirally wound in said chamber, and a cap of insulating material above said chamber having a passage communicating therewith.

6. In an electric heater, a casing, a heating unit supported by said casing comprising an upwardly diverging chamber surrounded by insulating material, a helical coil spirally wound in said chamber, and a cap of insulating material above said heating unit and having a conical passage therein communicating with said chamber.

7. The process of making a heating unit for electric heaters which consists of preparing a base of insulating material forming an upwardly diverging chamber therein, placing a layer of cement on the surface of said chamber, imbedding portions of a coil in said cement, and baking said cement.

8. The process of making a heating unit for electric heaters which consists in preparing a base having an upwardly diverging chamber, coating the surface of said chamber with cement, imbedding a heating coil in said cement, and baking the cement by passing current through said coil.

9. The process of making a heating unit for electric heaters which consists in forming a chamber in a base of porous material, filling the chamber with alundum cement, allowing the porous base to extract water from a layer of cement adjacent to the walls of the chamber, pouring out the more fluid cement, winding a coil on a tool having a shape complemental to the shape of the chamber, imbedding coil in the cement on the surface of the chamber, removing the tool from the coil, and baking the unit to harden the cement.

10. The process of making a heating unit for electric heaters which consists in forming an upwardly diverging chamber in a base of porous material, coating the surface of said chamber with a layer of alundum cement, winding a helical coil into a spiral conformation on the surface of a tool shaped complementary to the chamber, annealing the coil while held in position on the tool, imbedding the coil in the layer of cement, and baking the unit to harden the cement.

11. The process of making a heating unit for electric heaters which consists in providing a base of porous insulating material with an upwardly diverging chamber, filling the chamber with alundum cement of about the consistency of commercial cream, allowing the base to extract sufficient water from the cement to form a stiffened layer of suitable thickness adjacent to the walls thereof, pouring off the more liquid cement, winding a helical coil in a spiral groove on the face of a tool of shape complementary to said chamber, annealing the coil on the tool, adding water to the cement in said chamber, inserting the tool in the chamber, and slightly imbedding the nether portions of the coil in the cement, releasing the coil and removing the tool and baking the unit to harden the cement.

12. In an electric heater, a casing, a heating unit therein comprising a base of insulating material having a chamber in its upper portion, a coil wound about the surface of said chamber and a cap of insulating material above said heating unit and having a passage therein for heat.

13. In an electric heater, a casing, means for supporting said casing, a heating unit in said casing comprising a base of insulating material having a chamber in its upper side, a coil in said chamber, and a cap of insulating material above said chamber having a passage communicating therewith.

14. The process of making a heating unit for electric heaters which consists of preparing a base of insulating material forming an upwardly opening chamber therein, placing a layer of cement on the surface of said chamber, embedding portions of a coil in said cement, and baking said cement.

15. The process of making a heating unit for electric heaters which consists in preparing a base having an upwardly opening chamber, coating the surface of said chamber with cement, embedding a heating coil in said cement, and baking the cement by passing current through said coil.

16. The process of making a heating unit for electric heaters which consists in forming an upwardly opening chamber in a base of porous material, coating the surface of said chamber with a layer of alundum cement, winding a coil on the surface of a tool shaped complementary to the chamber, embedding the coil in a layer of cement, and baking the unit to harden the cement.

17. In an electric heater, a heating unit comprising a base of insulating material, a heating coil on said base, and cement securing the coil to said base, spaced portions of the coil being embedded in the cement.

18. In an electric heater, a heating unit comprising a base of insulating material, having a chamber therein, a heating coil in said chamber, and cement securing said unit in the form of a coil of wire to said base and covering spaced portions of said wire.

PAUL E. KLOPSTEG.
CARL S. HORNBERGER.
WILLARD H. FARR.